INVENTOR.
MARIO CUNIBERTI

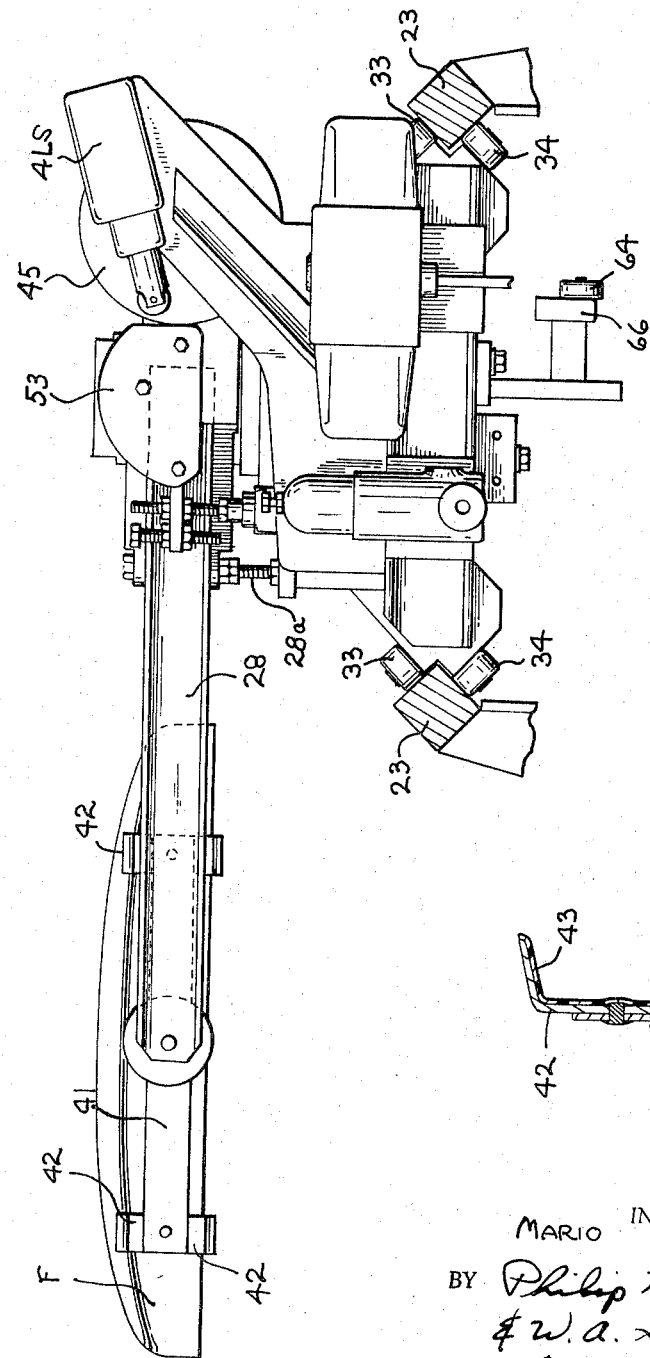

INVENTOR
MARIO CUNIBERTI
BY Philip M. Rice
& W. A. Schaich
ATTORNEYS

April 18, 1967 M. CUNIBERTI 3,314,554
ARTICLE HANDLING AND TRANSFERRING
Filed April 26, 1965 11 Sheets-Sheet 8

INVENTOR.
MARIO CUNIBERTI
BY Philip M. Rice
& W. A. Schaich
ATTORNEYS

April 18, 1967 — M. CUNIBERTI — 3,314,554
ARTICLE HANDLING AND TRANSFERRING
Filed April 26, 1965 — 11 Sheets-Sheet 10

INVENTOR.
MARIO CUNIBERTI
BY Philip M. Rice
& W. A. Schaich
ATTORNEYS

United States Patent Office 3,314,554
Patented Apr. 18, 1967

3,314,554
ARTICLE HANDLING AND TRANSFERRING
Mario Cuniberti, Columbus, Ohio, assignor to Owens-Illinois, Inc., a corporation of Ohio
Filed Apr. 26, 1965, Ser. No. 450,981
25 Claims. (Cl. 214—1)

This invention relates to an article handling and transferring apparatus and particularly to an apparatus for removing hot glass articles from a conveyor on which they have been placed after forming and for transferring them to a lehr.

In the handling of articles, it is often desirable to transfer the article from one position to which it has been delivered by hand or by a conveyor and deliver it to one of a plurality of positions in succession in a cyclic manner. In such handling, it is also desirable to invert the article because of the configuration of the article and process requirements.

More specifically in the manufacture of glass articles, such as the face plates of cathode ray tube bulbs, it is desirable to deliver each face plate after forming to one of a plurality of transverse positions on a lehr belt which thereafter moves the face plate through the lehr in order to anneal the face plate. Conventionally, the face plates are made by pressing a charge of molten glass to form the viewing portion and a peripheral flange portion that extends upwardly. The face plate is removed from the press and must be inverted so that the flange extends downwardly when it is placed upon the lehr belt. Since the face plate has just been formed and retains a large amount of heat from the forming operation, it is essential that it be handled carefully in order to prevent distortion of the hot glass.

It is therefore an object of this invention to provide an apparatus for handling articles wherein the articles are transferred from a pick up station to one of a plurality of delivery stations in a cycle and wherein each article is inverted during the transfer.

It is a further object of the invention to provide an apparatus for handling hot face plates for glass cathode tube bulbs which are delivered to a pick up station with the flange extending upwardly wherein the face plates are gripped, inverted and delivered cylically to one of a plurality of delivery stations transversely along a lehr belt so that the lehr belt is loaded to carry the face plates through the lehr with the flanges of the face plates extending downwardly.

It is a further object of the invention to provide such an apparatus wherein the successive gripping, inverting, moving and delivery actions are performed automatically.

In the drawings:

FIG. 6 is a side elevational view of the apparatus shown in FIG. 4.

FIG. 7 is a sectional view taken along the line 7—7 in FIG. 5.

*General Construction*

Figure 1:
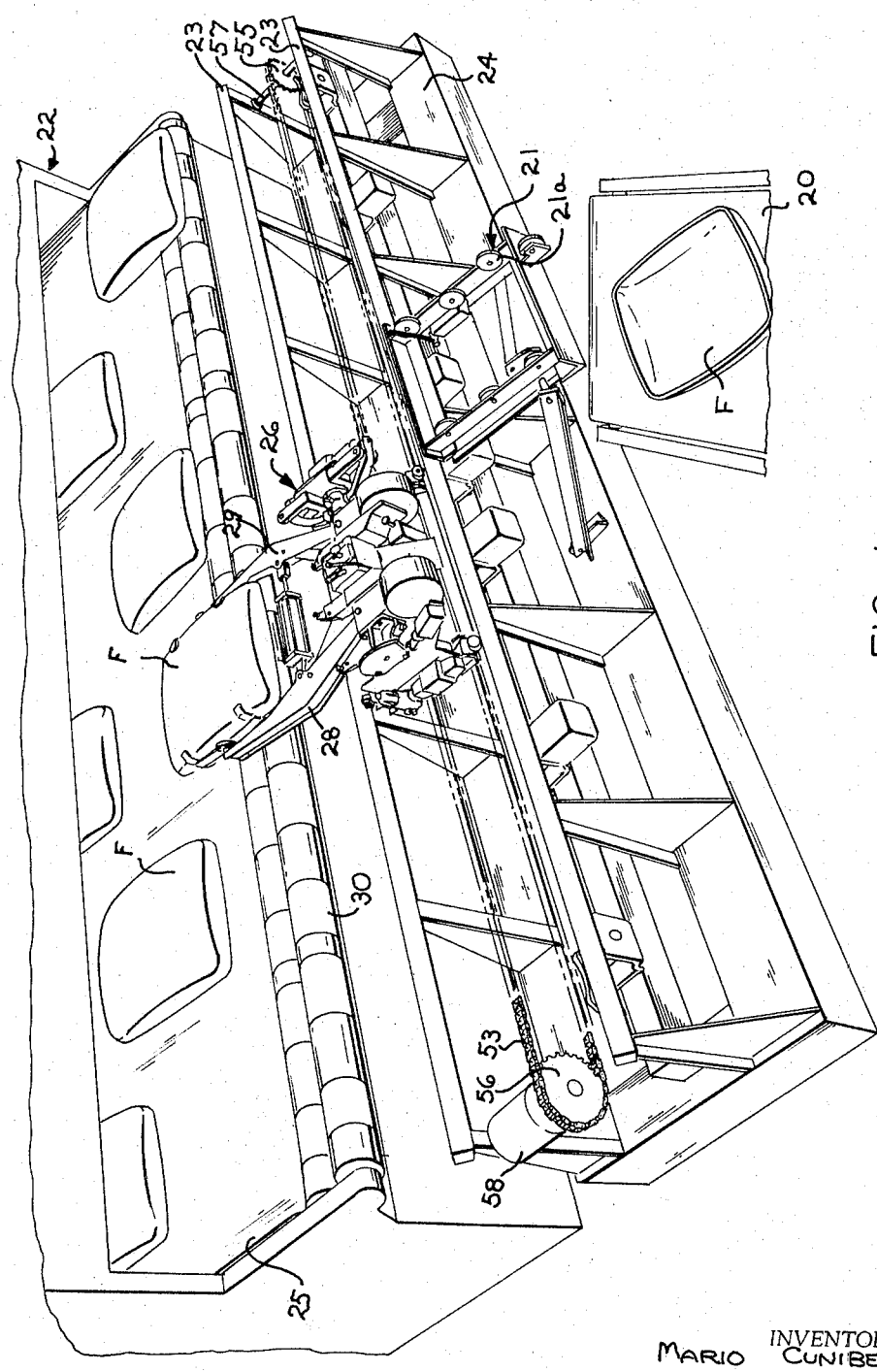
FIG. 1 is a fragmentary perspective view of an apparatus embodying the invention, parts being broken away.
Figure 2:
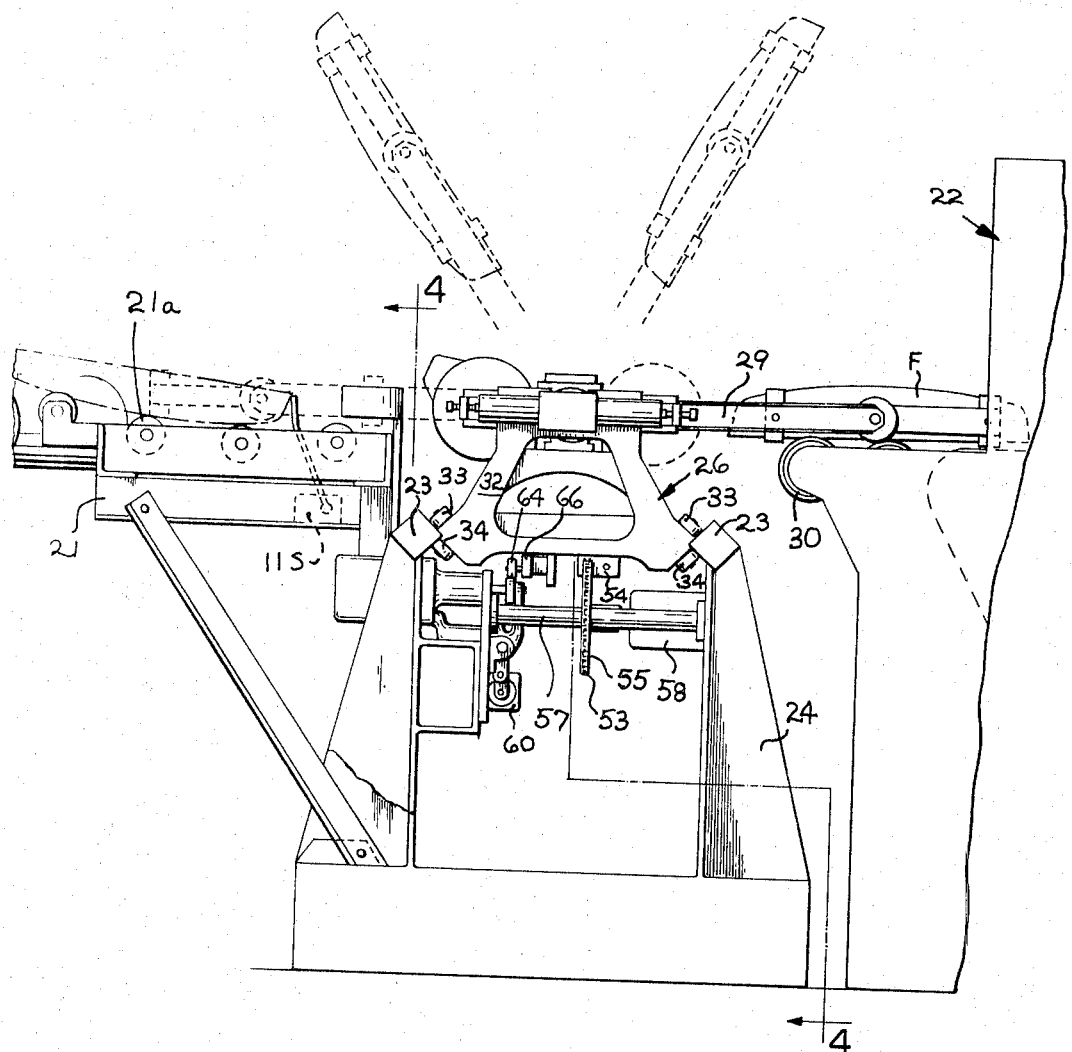
FIG. 2 is a side elevational view of the apparatus.
Figure 3:
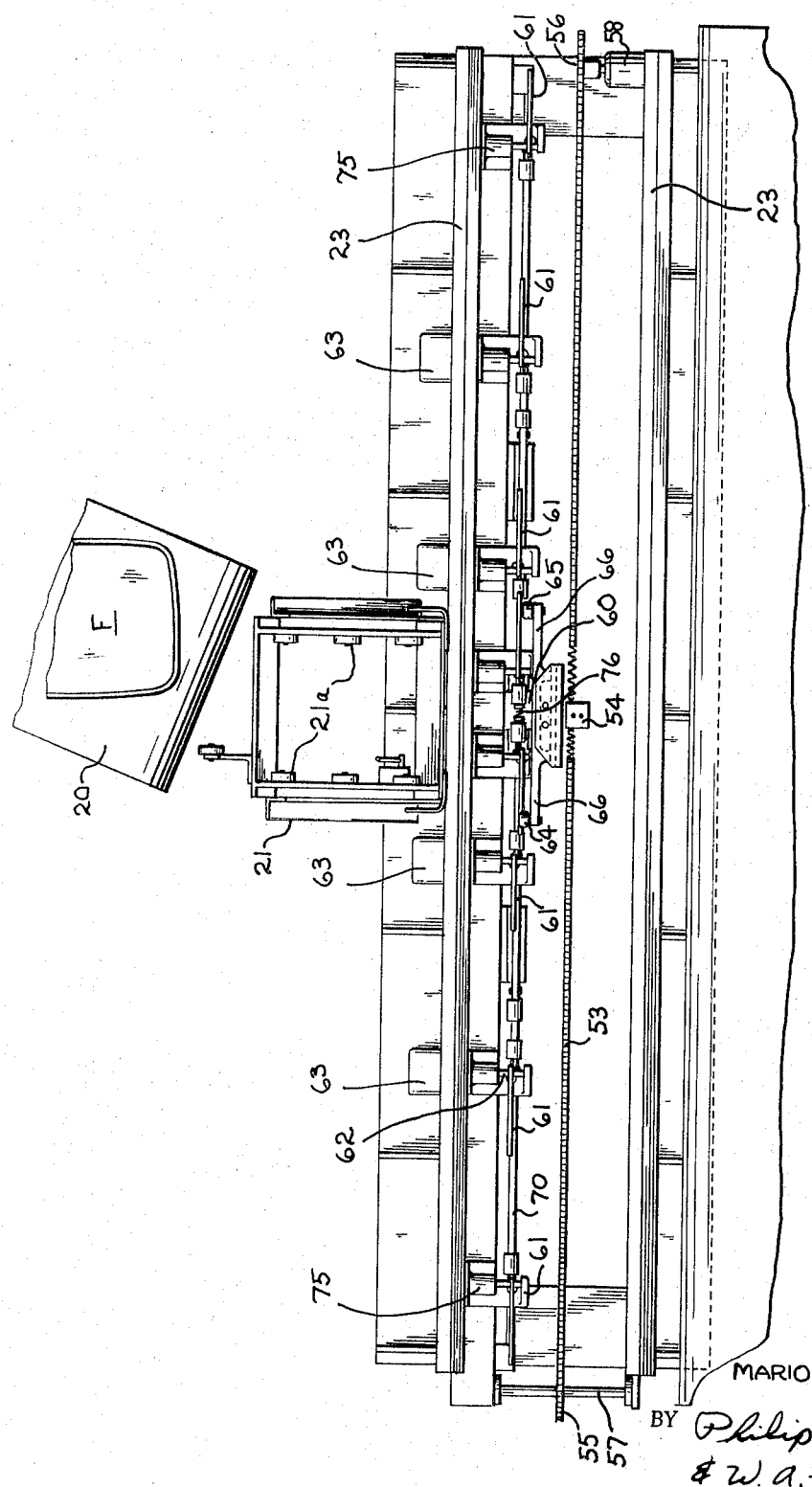
FIG. 3 is a fragmentary plan view of the apparatus.

Referring to FIGS. 1–3, the apparatus embodying the invention is adapted to engage an article such as a glass face plate F which is delivered from a forming mechanism (not shown) by a conveyor 20 to rollers 21a at a pick up station 21 with its peripheral flange extending upwardly and to transfer the face plate F from pick up station 21 to one of a plurality of positions adjacent a lehr 22 cyclically and at the same time invert each face plate so the peripheral flange extends downwardly.

More specifically the apparatus comprises a track formed by rails 23 on a frame 24 supported adjacent the end of the lehr belt 25 on the lehr 22. A carriage 26 is supported on the rails 23 and is movable transversely along the end of the lehr 22 adjacent the end of the belt 25. A pair of arms 28, 29 are mounted on the carriage 26 for movement toward and away from one another and for swinging movement in a vertical plane from one side of the frame 24 to the opposite side of the frame 24. The arms 28, 29 are adapted to be actuated at the pick up station 21 to grip a face plate F. The carriage is then moved along the track formed by the rails 23 and the arms are swung to invert the face plate F and deliver it to a position along the edge of the lehr belt 25. More specifically the arms 28, 29 deliver the face plate to power driven rollers 30 mounted on the frame 24 and driven at the same speed as the lehr belt 25 so that the rollers 30 transfer the inverted face plate F onto the lehr belt 25.

As presently described, the movement of the carriage along the rails 22 is cyclically controlled so that the face plates F are delivered at different transverse positions of the lehr belt. The carriage moves alternately short and long distances so that each face plate can be moved away from delivery position without interfering with the arms and so that successive face plates are not deposited adjacent one another. The cyclic operation also insures that the lehr belt will be uniformly loaded resulting in a uniform weight load on the lehr belt and a more uniform heat load in the lehr.

*Carriage construction*

Referring to FIGS. 2 and 5–8, carriage 26 comprises longitudinally extending members 31 and generally vertically extending end plates 32. Rollers 33, 34 on the carriage 26 engage the square rails 23 to guide the carriage 26 along the track formed by the rails 23. Arms 28, 29 are pivoted to brackets 35, 36 on the carriage 26 that, in turn, are fixed on a shaft journalled in a housing 37, of a rotary cylinder 44 so that the arms 28, 29 may be swung approximately 180 degrees from one side of the frame 24 to the other. A cylinder 38 has the cylinder housing 39 thereof pivoted to arm 28 and the piston rod 40 thereof pivoted to arm 29 so that operation of the cylinder 38 causes the arms 28, 29 to move toward and away from one another.

Figure 5:
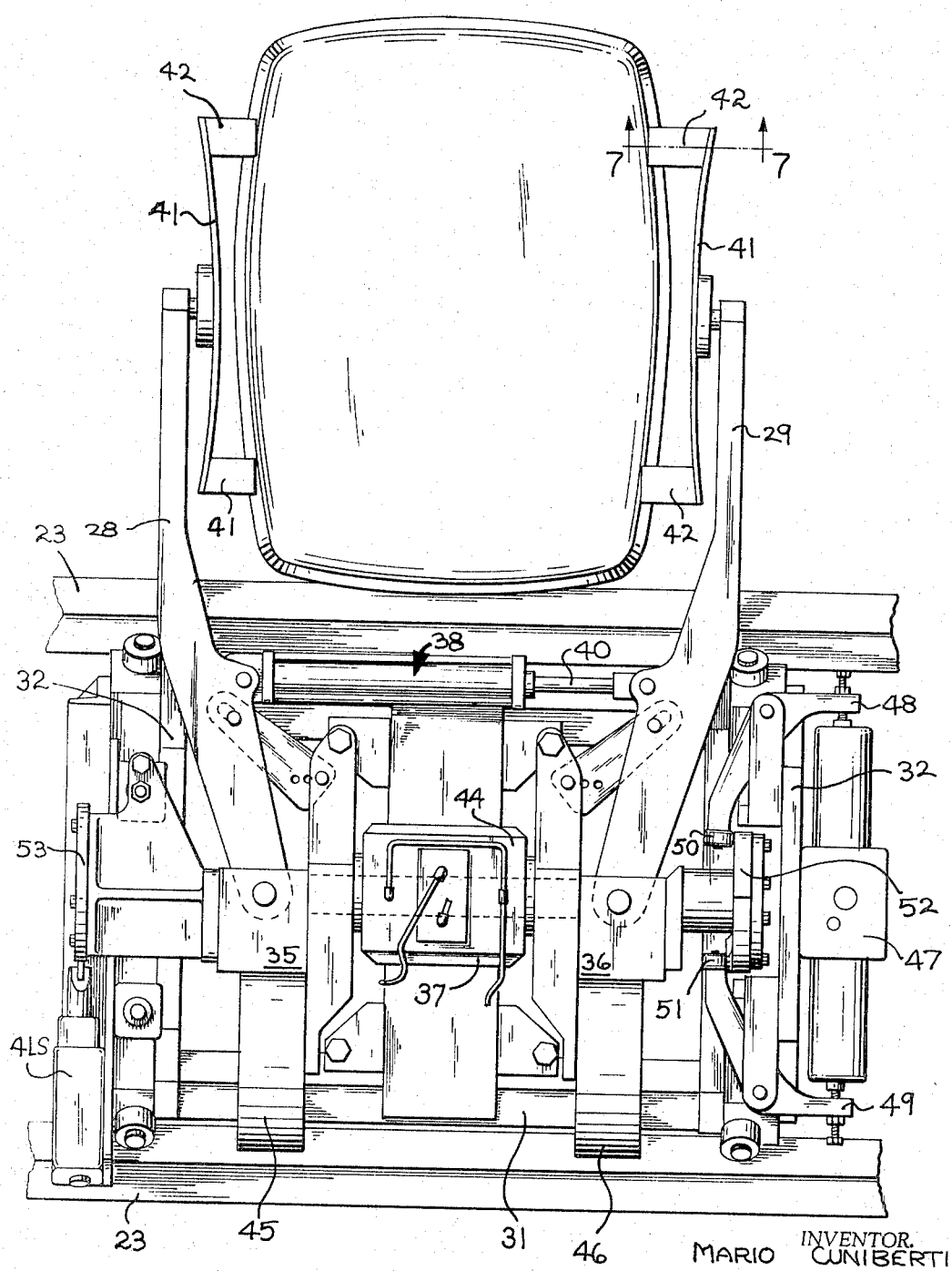
FIG. 5 is a fragmentary plan view on an enlarged scale of a portion of the apparatus shown in FIGS. 1–3.
Figure 8:
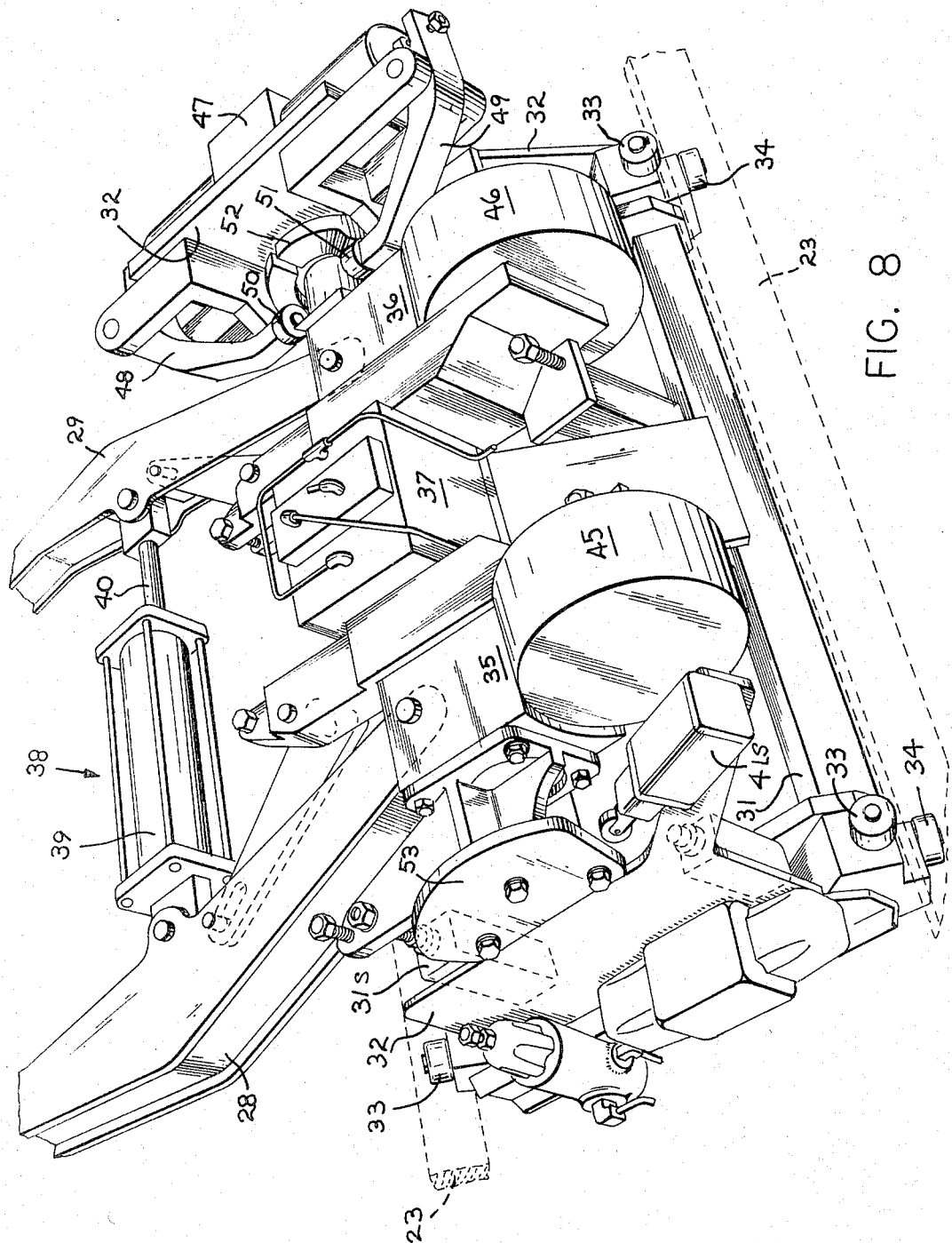
FIG. 8 is a fragmentary perspective view of the apparatus shown in FIGS. 4 and 5.

As shown in FIGS. 5–7, each of the arms 28, 29 supports a bracket 41 having generally U-shaped gripping portions 42 that are adapted to firmly engage opposed portions of the flange of a face plate F. The gripping portions 42 may have a layer 43 of Teflon or other heat resistant material on the article contacting portions thereof.

Rotary hydraulic cylinder 44 rotates the shaft on which arms 28, 29 are fixed to swing the arms. As further shown in FIGS. 5 and 8, counterweights 45, 46 are provided on the arms 28, 29, respectively.

A four-way valve 47 is mounted on one end plate 32 of the carriage 26 and has a plunger thereof operatively connected to levers 48, 49 that are pivoted on the plate 32 and have cam followers 50, 51 thereon engaging a cam 52 that rotates with the arms 28, 29. Valve 47 controls the operation of cylinder 44 which swings the arms 28, 29. Cam 52 operates through levers 48, 49 to return the plunger of the valve 47 to a neutral position against the action of the solenoids that operate the valve 47 as the arms 28, 29 reach their downward position on each side of the track. This stops the movement of the arms. The arms are positively stopped by stop screws 28a (FIG. 1). A cam 53 is also fixed on the bracket 35 and is adapted to actuate a limit switch 4LS, as presently described.

Thus, actuation of cylinder 38 moves the arms 28, 29 into and out of article gripping position where the article is trapped but not squeezed. Actuation of rotary cylinder 44 swings the arms to and from a position on one side of the frame 24 to the other.

*Carriage moving construction*

Figure 4:
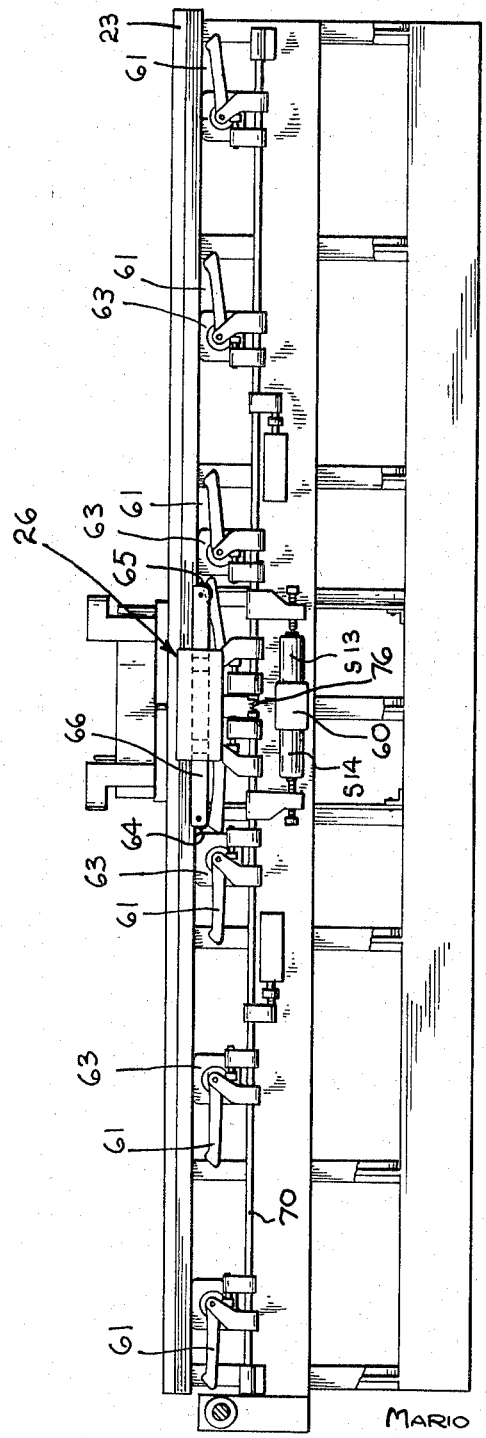
FIG. 4 is a fragmentary sectional view taken along the line 4—4 in FIG. 2, parts being broken away.

Referring to FIGS. 2, 3 and 4, the carriage 26 is moved along the track formed by the rails 23 by an arrangement which includes a chain 53 which is trained over sprockets 55, 56 at opposite ends of the frame 24 and has the ends thereof fixed to a bracket 54 on the carriage 26. Sprocket 55 is mounted on an idler shaft 57 and sprocket 56 is mounted on the output shaft of a rotary hydraulic motor 58. By operation of the motor 58, the carriage 26 is moved back and forth along the track.

Figure 9:
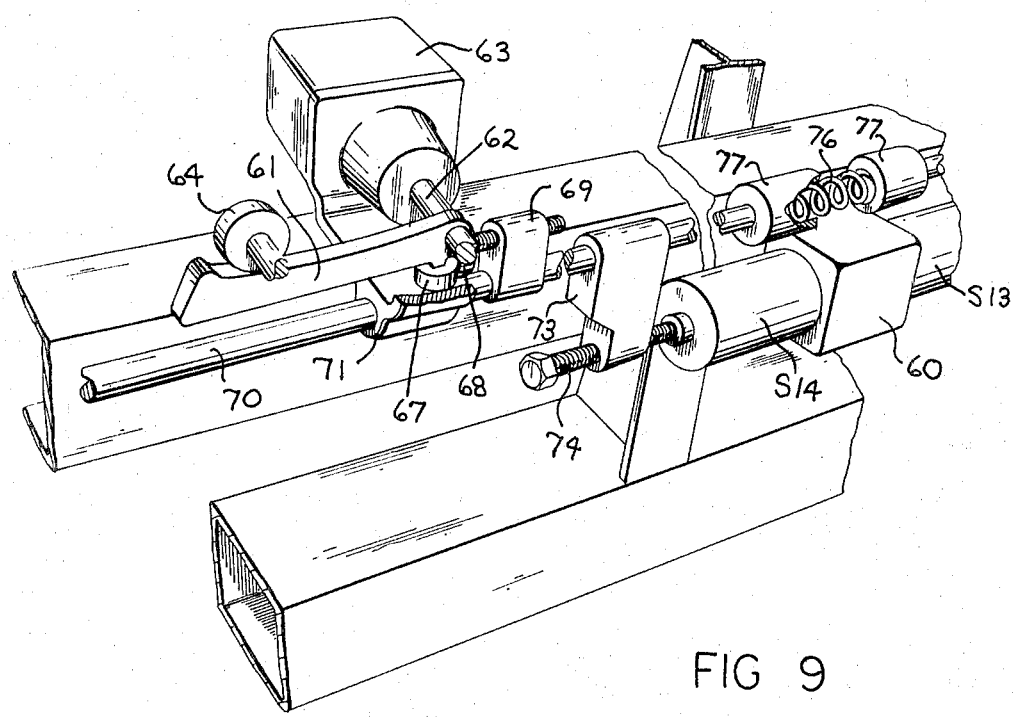
FIG. 9 is a fragmentary perspective view on an enlarged scale showing a portion of the apparatus shown in FIG. 2 with the parts in a different operative position.
Figure 10:
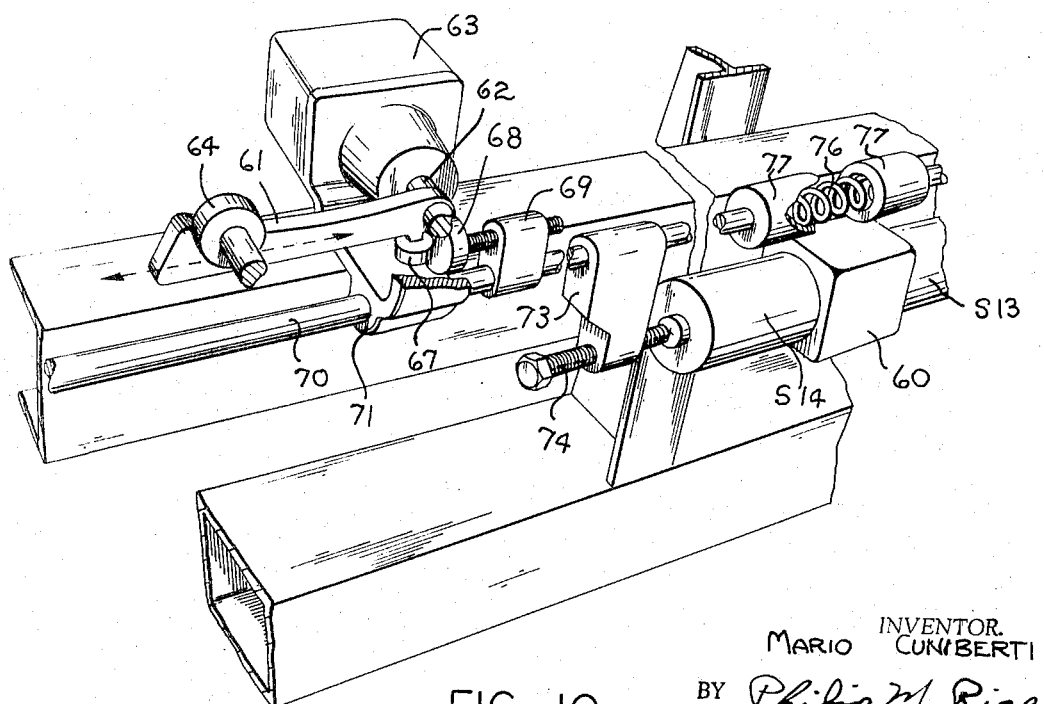
FIG. 10 is a fragmentary perspective view similar to FIG. 7, showing the parts in a different operative position.

Referring to FIG. 3, a four-way valve 60 controls the operation of the motor 58. Four-way valve 60 is D.C. solenoid operated but provision is made for stopping the movement of the carriage by overcoming the solenoid and returning the plunger of the valve 60 to a neutral position. This construction comprises a cam lever 61 which is mounted on a shaft 62 of a solenoid 63 at each of the delivery or stop stations. As shown in FIGS. 3, 9 and 10, the solenoids 63 are adapted to be energized to project the shaft 62 and in turn the cam lever 61 outwardly into the path of one of the rollers 64, 65 on a bracket 66 mounted on the underside of the carriage 26 (FIGS. 4, 9, 10). If the carriage is moving to the left with reference to FIG. 4, roller 64 contacts one of the cam levers 61; if to the right, roller 65 contacts one of the cam levers. 61. If a solenoid 63 at a particular delivery station is energized, engagement of the roller 64 or 65 with the upper surface of the cam lever 61 at that station will cause the cam lever to move in a counterclockwise direction as viewed in FIG. 9. If the solenoid is not energized at a station, the roller 64 or 65 will not contact the corresponding cam lever 61 (FIG. 10).

Each cam lever 61 has an actuating roller 67 projecting downwardly therefrom and adapted to engage an adjustable abutment 68 on a bracket 69 fixed on a rod 70 which, in turn, is mounted for translating movement in brackets 71. A similar arrangement is provided on each end of the valve 60 (FIGS. 3, 4) so that when a cam lever 61 is moved downwardly, the rod is translated toward the four-way valve 60. As presently described, the four-way valve 60 is controlled by solenoids S13, S14. Movement of the rod 70 toward the valve 60 causes a bracket 73 thereon to move a projecting screw 74 in a direction to engage the plunger of one of the solenoids S13, S14, to overcome the action of the solenoid and return the plunger of the four-way valve 60 progressively to its neutral position thereby decreasing the flow of fluid to the hydraulic motor 58 and stopping the movement of the carriage 26.

As shown in FIG. 3, the cam levers 61 at the end stations are not mounted on solenoids but are merely pivoted to brackets 75. This provides for positive interruption of the movement of the carriage as it reaches each end of the track. The rods 70 are yieldingly urged away from one another by a spring 76 acting between open-ended cylindrical guides 77.

In operation, when a face plate is present at the pick up station 21, the arms 28, 29 are moved inwardly to grip the face plate and the arms are swung upwardly to lift the face plate off the rollers of the pick up station. As soon as the arms have cleared the pick up station, the carriage 26 is moved to one side or the other on the track depending upon the direction of energization of the rotary hydraulic motor 58. The control of the motor 58, as presently described, is cyclic by a step switch. As the carriage is moved along the track and approaches a desired position, one of the rollers 64, 65 will engage a cam lever 61 which has been moved outwardly at the desired station by operation of the solenoid 63 to deactivate the valve 60 and stop the carriage. The arms will have inverted the face plate into position so that when the arms are moved away from one another, the face plate is deposited at the desired position on the driven rollers adjacent the lehr belt. The arms 28, 29 are swung upwardly and the carriage is moved back to the pick up station where the arms are again positioned for gripping a face plate at the pick up station. Presence of both the carriage and a face plate at the pick up station results in the beginning of another cycle.

*Hydraulic circuit*

Figure 11:
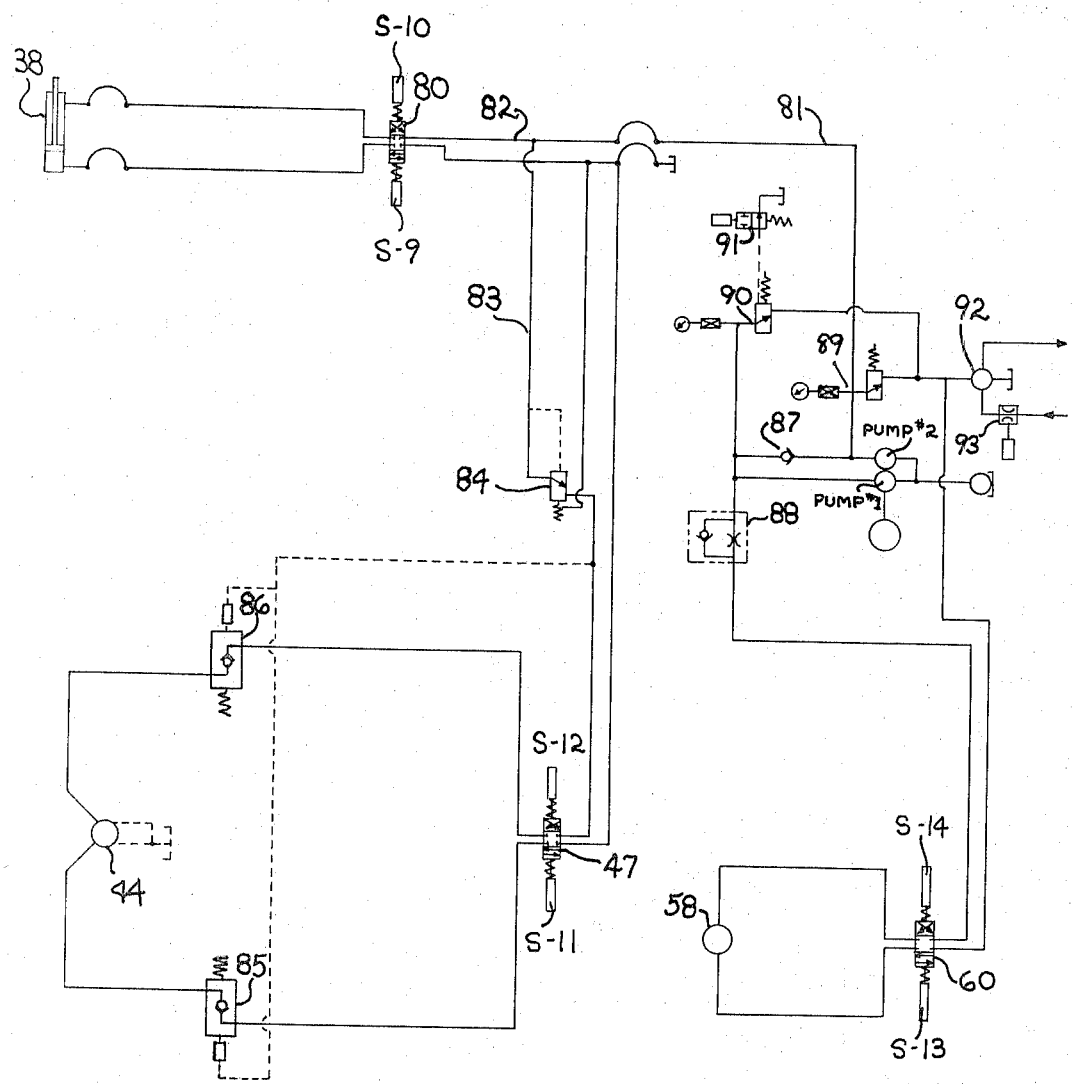
FIG. 11 is a schematic type hydraulic diagram.
Figure 12:
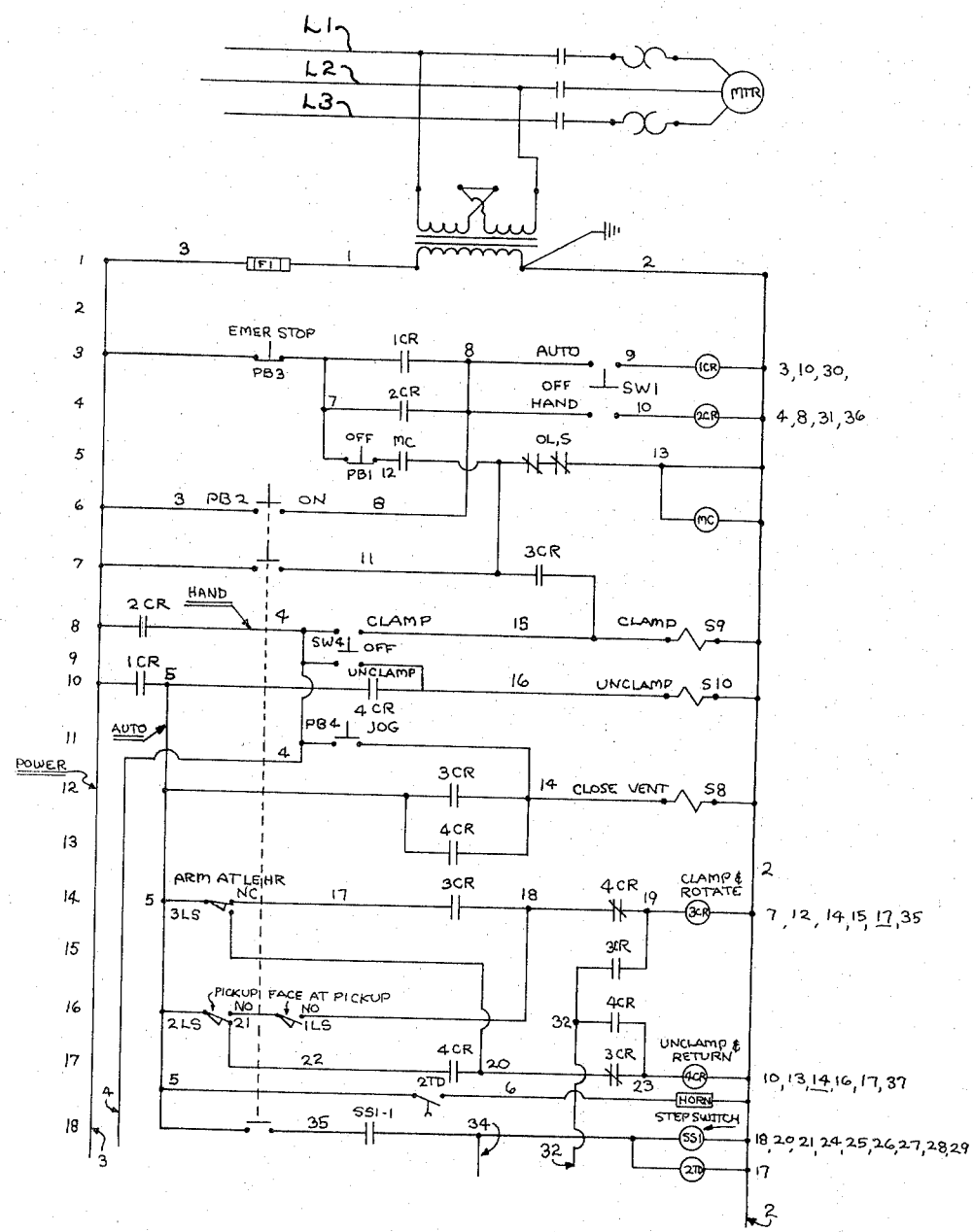
FIGS. 12 and 13 are schematic electrical diagrams.
Figure 13:
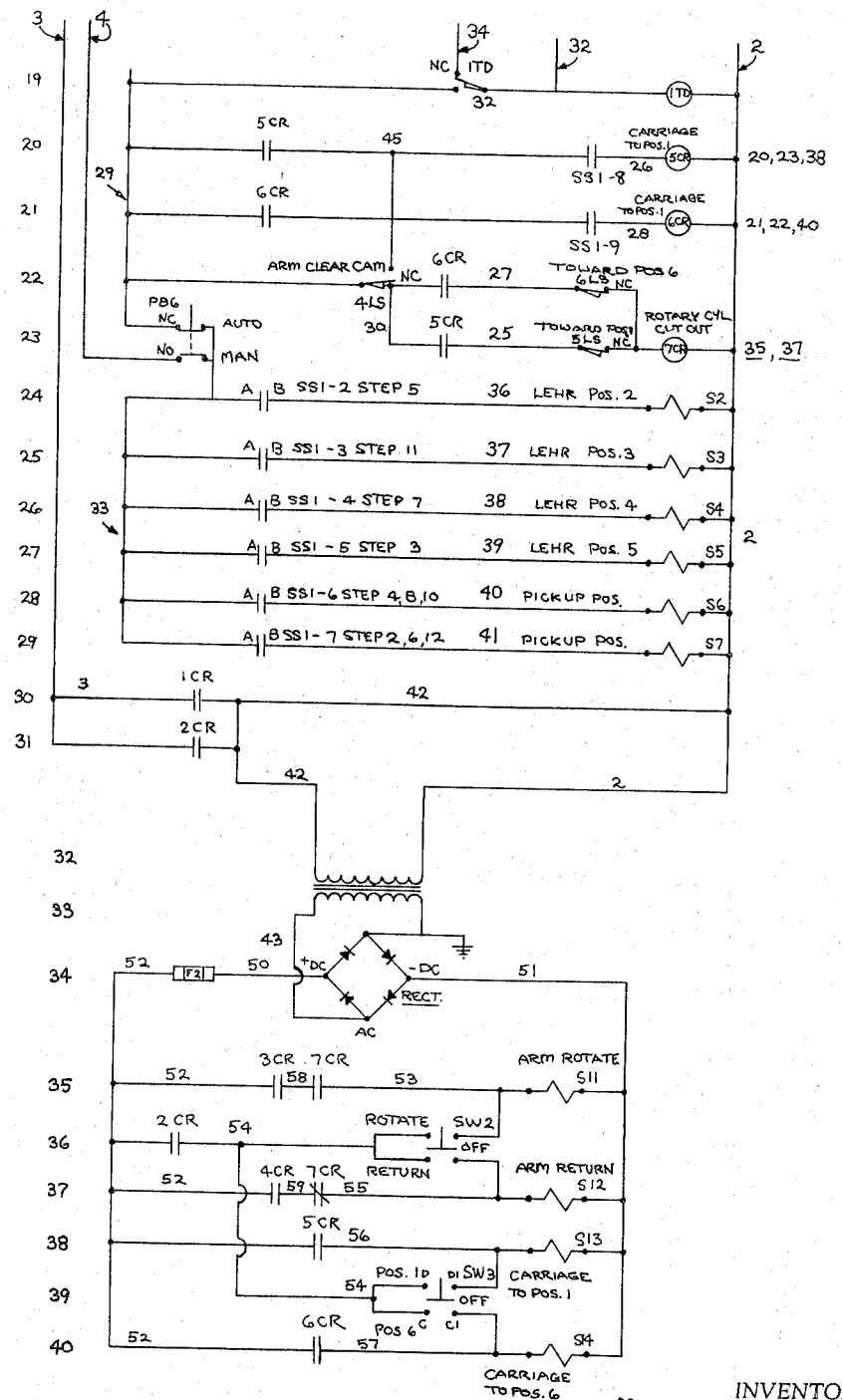

Referring to FIGS. 11–13, for purposes of clarity, the various valves and cylinders have been shown with corresponding reference numerals.

Referring to a schematic hydraulic circuit shown in FIG. 11, hydraulic fluid under pressure is provided by a pump #2 rotated by an electric motor which supplies fluid through line 81 and line 82 to four-way valve 80 which is controlled by solenoids S9, S10. The valve 80, in turn, controls the flow to cylinder 38 which moves the arms 28, 29 to clamp and unclamp a face plate.

Line 81 also supplies fluid through line 83 from pump #2 to four-way valve 47 that is controlled by solenoids S11, S12. The four-way valve 47, in turn, operates rotary cylinder 44 for swinging the arms. A sequence valve 84 in line 83 insures that cylinder 38 will be operated to clamp the face plate before the arms are rotated by operation of rotary cylinder 44.

One-way valves 85, 86 prevent creep and lock the rotary cylinder 44 until such time as the clamping cylinder 38 is closed.

Fluid is supplied under pressure from pump #1 and a flow control valve 88 to the four-way valve 60 which is controlled by solenoids S13, S14. Four-way valve 60, in turn, controls the rotary cylinder 58 that moves the carriage 26 along the track. Flow control valve 88 controls the speed of movement of the carriage.

The hydraulic circuit includes pressure control valves 89, 90 and a solenoid actuated by-pass or vent valve 91, the latter being energized when pressure is demanded. Valve 91 vents pressure of pump #2 through one-way valve 87. Pump #1 operates at higher pressure than pump #2. The circuit also includes a heat exchanger 92 controlled by a thermostat 93, in accordance with conventional practice.

*Electrical circuit*

Referring to FIGS. 12 and 13, which are electrical schematic diagrams, it can be seen that A.C. power is supplied to one portion (FIG. 12) of an electrical circuit from lines L1, L2, L3 and is provided to another portion (FIG. 13) from lines 2, 3. D.C. power is supplied to a third portion of the circuit shown in FIG. 13 through lines 42 and 2.

The electrical circuit includes relay and limit switches which are operated to control the various cylinders for clamping and unclamping the face plate, swinging the arms, and moving the carriage along the track. In order to control the cyclic movement of a carriage to various positions along the track, a step switch is provided which is operated successively to control movement to various positions. In FIGS. 12 and 13, conventional numbering and labelling has been used for clarity in tracing the circuits.

Operation

In operation, switch SW1 is placed in "hand" position for manual operation. Push button switch PB2 is then pushed "on." This energizes relay 2CR for manual controls and relay MC for pump (1) motor power. Push button switch PB4 ("JOG") is used in conjunction with switches SW2, SW3 and SW4. It closes solenoid S8 on hydraulic system vent valve 91 for momentarily applying pressure to power the clamping or rotation of arms 28, 29 or the movement of carriage 26. The arms are clamped or unclamped by turning switch SW4 to select solenoid S9 or S10 on the clamp cylinder four-way control valve 80. Switch SW2 is operated to rotate arms 28, 29 toward the lehr or to return the arms 28, 29 to the opposite side of the track from the lehr by energizing corresponding solenoids S11 or S12 on the four-way control valve 47 which controls rotary cylinder 44.

Manually controlled carriage motion to the right or left is accomplished by actuating switch SW3 to select solenoid S13 or S14 which controls rotary cylinder 58 on the carriage motor four-way control valve 60.

The step switch SS1 has 12 step positions for a complete cycle and nine contacts which are designated as SS1-1 to SS1-9. These contacts are opened or closed in a given step of the cycle. The switch steps after the operation coil thereof is de-energized.

In order to manually stop the carriage at a lehr position other than 1 or 6 (corresponding to the end positions on the track) the step switch is rotated manually to the step that calls for closing of the contact corresponding to the solenoid in the lehr position desired. Example: In step 7, SS1-4 contact is closed for S4 solenoid at number 4 lehr position.

The carriage is stopped by the cam lever 61 on a solenoid 63 being extended to engage the roller 64 or 65 on the underside of the approaching carriage 26. The roller depresses the cam 61 which actuates rod 70 extending to a pin on the plunger of the carriage motor four-way control valve 60. This forces the four-way valve 60 to a neutral or closed position against the force of the valve solenoid S13 or S14 and stops the carriage drive motor 58. The carriage is stopped at center adjacent the pick up station by switch S6 as the carriage approaches from the right and by switch S7 as the carriage approaches from the left.

When switch SW1 is at "off," it will cut off "controls" only. Switch PB1 will cut off "motor" for hydraulic power only. Switch PB3 will cut everything off.

The switches are operated manually to bring the carriage at center (pick up station) with arms 28, 29 unclamped and down so that switch 2LS at the pick up station is actuated. The switch SW1 is then operated to "auto" position for automatic operation.

Push button PB2 is then pushed "on." This energizes relay CR1 for automatic controls and MC for pump motor power. PB2 also energizes SS1 coil through SS1-1 contact if the step switch happens to be on an odd numbered step. This synchronizes the step switch with the manually placed carriage and arms at the pick up position 21 to begin automatic operation.

When a face plate arrives at pick up position 21, it closes 1LS which energizes relay 3CR through normally closed contacts on relay 4CR and is locked in through 3LS and 3CR contacts (see line 14). Relay 3CR causes arms to clamp through solenoid S9 on valve 80 (lines 7 and 8), closes vent valve 91 for hydraulic power (line 12), opens circuit to relay 4CR (line 17) to prevent conflicting controls, energizes control valve 47 for arm rotation through solenoid S11, and energizes coil SS1 through time delay 1TD contacts (line 19). 1TD time delay is also energized and times out .6 second later, breaking contact to SS1 coil and causing it to step. At the same time, contact is made to wire number 29 which energizes the lehr position solenoid 63 that is programmed by the step switch position at that time. This determines at which lehr position the carriage will be stopped.

When carriage arms 28, 29 have lifted far enough to clear the loading cradle at pick up station 21, cam 53 actuates limit switch 4LS which energizes relay 5CR or relay 6CR for carriage motion to the right or left depending on whether contact SS1-8 or SS1-9 on the stepping switch is closed at that time. Relay CR5 or CR6 is locked in and feeds D.C. power to solenoids S13 or S14 on the carriage motor four-way control valve 58 (line 38 or 40).

In normal operation, the carriage reaches a station before the arms have swung down far enough to release limit switch 4LS from the cam 53. In this case the carriage is stopped as described in the description of the manual operation and the arms continue down. Limit switch 4LS drops off the cam 53 again but limit switch 6LS or 5LS has been opened by the carriage reaching its stop position and no function takes place through relay 7CR at this time.

However, if the carriage is slow in getting to its position, limit switch 4LS will drop off the cam 53 and energize relay CR7. This relay CR7 interrupts the power to the solenoid that control arm rotation four-way valve 47 (line 35 or 37). The valve 47 centers and stops further arm rotation until relay 7CR is de-energized by limit switch 6LS or 5LS actuated when the carriage arrives in its stop position. At this time the arms continue down as relay 5CR or 6CR is still locked in by the contacts on line 20 or 21.

When the arms complete their travel, they actuate limit switch 3LS (line 14) which opens relay 3CR, time delay 1TD, relay 5CR or 6CR, and the lehr position solenoid. Limit switch 3LS also energizes relay 4CR which locks itself through limit switch 2LS and normally closed contacts of relay 3CR (line 17). Relay 4CR performs in a similar manner as relay 3CR in returning the arms and carriage to the pick up position.

It can thus be seen that there has been provided an apparatus for gripping a face plate at a pick up station with its flange extending upwardly, inverting and delivering the face plate with its flange extending downwardly at one of a plurality of stations along a lehr. The pattern of distribution of the delivery of the face plates onto the lehr can be controlled as desired to result in a uniform weight and heat load on the lehr. Thus the face plates can be delivered alternately in opposite directions from the pick up station or any desired cycle and the cycle of actuation is controlled by the setting of the step switch.

I claim:
1. In an apparatus for handling and transferring articles, the combination comprising
   article engaging means,
   means for guiding said article engaging means from a pick up station to each of a plurality of delivery stations,
   means for actuating said article engaging means to cause said article engaging means to engage an article at said pick up station,
   means for actuating said article engaging means to cause said means to invert said article,
   means for moving said article engaging means cyclically to said delivery stations,
   means responsive to the simultaneous presence of an article and said article engaging means at said pick up station to cause said article engaging means to be actuated and said inverting means to be actuated, means responsive to the start of the inversion of an article to energize said moving means and thereby move said article engaging means toward a delivery station, means for cyclically determining the direction and extent of movement of said moving means, means responsive to the arrival of said article engaging means at a cyclically determined delivery station to de-energize said moving means, and means responsive to the completion of the inverting motion of said article at said delivery station to actuate said article engaging means to release the article and to actuate said moving means to return the article engaging means to said pick up station.

2. The combination set forth in claim 1 including means for preventing the completion of the inverting motion of the article before said article engaging means reaches said cyclically predetermined delivery station.

3. In an article handling and transfer apparatus, the combination comprising
a track,
a carriage mounted for movement along said track,
hydraulic means for moving said carriage along said track,
valve means for controlling said moving means,
means mounted on said carriage for gripping an article,
means for inverting said article gripping means from one side of the carriage to the other,
said carriage being movable along said track to and from a pick up station and a plurality of delivery stations,
first solenoid means for operating said valve means to actuate and de-actuate said hydraulic moving means,
cam means positioned at each said station,
means at each said station for moving said cam means into and out of the path of said carriage,
link means extending between said delivery stations and said valve means and operable upon engagement of said cam means at any said station with said carriage to move said valve means to position to de-activate said moving means.

4. The combination set forth in claim 3 wherein said link means comprises
a rod,
each said cam means being operatively connected to said rod whereby actuation of any of said cam means moves said rod to, in turn, move said valve means.

5. The combination set forth in claim 4 wherein each said cam means is mounted for movement transversely of said rod and is adapted to engage an abutment on said rod.

6. The combination set forth in claim 4 wherein said means for moving each said cam means comprises second solenoid means.

7. The combination set forth in claim 4 wherein said article gripping means comprises a pair of arms.

8. The combination set forth in claim 7 wherein said article gripping means includes a hydraulic cylinder for actuating said arms.

9. The combination set forth in claim 8 wherein said article gripping and said inverting means includes a second cylinder for swinging said arms from a position on one side of said track adjacent said pick up station to a position on the opposite side of said track adjacent one of said delivery stations.

10. In an article handling and transfer apparatus for removing hot glass articles from a pick up station and delivering them to spaced points on a lehr, the combination comprising
a track adapted to be mounted adjacent the lehr,
a carriage mounted for movement along said track,
means for moving said carriage along said track,
valve means for controlling said moving means,
means mounted on said carriage for gripping an article,
means on said carriage for moving said gripping means from one side of the track to the other to invert an article,
said carriage being movable along said track to and from a pick up station and a plurality of delivery stations,
first solenoid means for operating said valve means to actuate and de-actuate said moving means,
cam means positioned at each said station and movable into and out of the path of said article gripping means,
link means extending between said delivery stations and said valve means and operable upon engagement of said cam means at any said station with said carriage to move said valve means to position to de-activate said moving means,
said link means comprising
a rod,
each said cam means being operatively connected to said rod whereby actuation of any of said cam means moves said rod to, in turn, move said valve means,
each said cam means being mounted for movement transversely of said rod and being adapted to engage an abutment on said rod,
said means for moving each said cam means comprising second solenoid means,
said article gripping means comprising a pair of arms,
a hydraulic cylinder for actuating said arms,
said article gripping and inverting means including a second cylinder for swinging said arms from a position on one side of said track adjacent said pick up station to a position on the opposite side of said track adjacent one of said delivery stations.

11. In an article handling and transfer apparatus, the combination comprising
a track,
a carriage mounted for movement along said track,
means for moving said carriage along said track,
means for controlling said moving means,
arms mounted on said carriage for movement toward and away from one another to grip and release an article,
said carriage being movable along said track to and from a pick up station and a plurality of delivery stations,
means on said carriage for swinging said arms from one side of said track to the other,
means for operating said controlling means to actuate and de-actuate said hydraulic moving means,
cam means positioned at each said delivery station and movable into and out of the path of said article engaging means,
means at each said station for moving said cam means into and out of the path of said carriage,
link means extending between said delivery stations and said controlling means and operable upon engagement of said cam means at any said station with said carriage to move said controlling means to position to de-activate said moving means,
said link means comprising
a rod,
each said cam means being operatively connected to said rod whereby actuation of any of said cam means moves said rod to, in turn, move said controlling means.

12. The combination set forth in claim 11 including means responsive to the arrival of said carriage at a delivery station for de-activating said means for moving said carriage to said delivery station.

13. In a apparatus for handling and transferring articles, the combination comprising
article engaging means,
means for guiding said article engaging means from a pick up station to each of a plurality of delivery stations,
means for actuating said article engaging means to cause said article engaging means to engage an article at said pick up station,
means for actuating said article engaging means to cause said means to invert said article,
means for moving said article engaging means to and from said pick up station and said delivery stations,
and means responsive to the simultaneous presence of said article engaging means and said article at said pick up station to energize said actuating means for said article engaging means.

14. In an apparatus for handling and transferring articles, the combination comprising
article engaging means,
means for guiding said article engaging means from a pick up station to each of a plurality of delivery stations,
means for actuating said article engaging means to cause said article engaging means to engage an article at said pick up station,
means for actuating said article engaging means to cause said means to invert said article,
means for moving said article engaging means to and from said pick up station and said delivery stations,
and means responsive to the actuation of said article engaging means to energize said inverting means.

15. In an apparatus for handling and transferring articles, the combination comprising
article engaging means,
means for guiding said article engaging means from a pick up station to each of a plurality of delivery stations,
means for actuating said article engaging means to cause said article engaging means to engage an article at said pick up station,
means for actuating said article engaging means to cause said means to invert said article,
means for moving said article engaging means to and from said pick up station and said delivery stations,
and means responsive to the energization of said inverting means to energize said moving means.

16. In an apparatus for handling and transferring articles, the combination comprising
article engaging means,
means for guiding said article engaging means from a pick up station to each of a plurality of delivery stations,
means for actuating said article engaging means to cause said article engaging means to engage an article at said pick up station,
means for actuating said article engaging means to cause said means to invert said article,
means for moving said article engaging means to and from said pick up station and said delivery stations,
and means responsive to the complete inversion of said article and the movement of said article engaging means to a delivery station to energize said moving means in order to return said article engaging means to the pick up station.

17. In an apparatus for handling and transferring articles, the combination comprising
article engaging means,
means for guiding said article engaging means from a pick up station to each of a plurality of delivery stations,
means for actuating said article engaging means to cause said article engaging means to engage an article at said pick up station,
means for actuating said article engaging means to cause said means to invert said article,
means for moving said article engaging means to and from said pick up station and said delivery stations,
and means for cyclically conditioning each said delivery station to interrupt said article moving means at said station.

18. In an apparatus for handling and transferring articles, the combination comprising
article engaging means,
means for guiding said article engaging means from a pick up station to each of a plurality of delivery stations,
means for actuating said article engaging means to cause said article engaging means to engage an article at said pick up station,
means for actuating said article engaging means to cause said means to invert said article,
means for moving said article engaging means to and from said pick up station and said delivery stations,
and means responsive to the approach of said article engaging means to the delivery station to retard the movement thereof.

19. In an apparatus for handling and transferring articles, the combination comprising
article engaging means,
means for guiding said article engaging means from a pick up station to each of a plurality of delivery stations,
means for actuating said article engaging means to cause said article engaging means to engage an article at said pick up station,
means for actuating said article engaging means to cause said means to invert said article,
means for moving said article engaging means to and from said pick up station and said delivery stations,
and means for preventing said inverting means from completely inverting said article before said article engaging means reaches its respective delivery station.

20. In an apparatus for handling and transferring articles, the combination comprising
article engaging means,
means for guiding said article engaging means from a pick up station to each of a plurality of delivery stations,
means for actuating said article engaging means to cause said article engaging means to engage an article at said pickup station,
means for actuating said article engaging means to cause said means to invert said article,
hydraulic means for moving said article engaging means to each of said delivery stations,
valve means for controlling said hydraulic means,
means for actuating said valve means,
and means responsive to the arrival of said article engaging means at a station for de-activating said valve means and article engaging means to release an article held thereby,
said last-mentioned means comprising
cam means movably mounted at each said delivery station for movement into and out of the path of said article engaging means,
and linkage means operatively connecting said cam means and said valve means whereby when said cam means at one of said stations is in the path of said article engaging means, it is engaged by said article engaging means and operates said linkage to move said valve means and thereby interrupt the movement of said article engaging means.

21. In an apparatus for handling and transferring articles, the combination comprising
article engaging means,
means for guiding said article engaging means from a pick up station to each of a plurality of delivery stations,
means for actuating said article engaging means to cause said article engaging means to engage an article at said pick up station, means for actuating said article engaging means to cause said means to invert said article, hydraulic means for moving said article engaging means to each of said delivery stations, valve means for controlling said hydraulic means, means for actuating said valve means, means responsive to the arrival of said article engaging means at a station for de-activating said valve means and article engaging means to release an article held thereby, and means responsive to the presence of said article engaging means and an article at said pick up station for energizing said valve actuating means.

22. In an apparatus for handling and transferring hot glass articles such as face plates from a pick up station to a plurality of delivering stations, the combination comprising article engaging means, means for guiding said article engaging means from a pick up station to each of a plurality of delivery stations, means for actuating said article engaging means to cause said article engaging means to engage an article at said pick up station, means for actuating said article engaging means to cause said means to invert said article, means for moving said article engaging means to each of said delivery stations, means for controlling said moving means, and means responsive to the arrival of said article engaging means at a station for de-activating said controlling means and article engaging means to release an article held thereby, said last-mentioned means comprising cam means movably mounted at each said delivery station for movement into and out of the path of said article engaging means, and linkage means operatively connecting said cam means and said moving controlling means whereby when said cam means at one of said stations is in the path of said article engaging means, it is engaged by said article engaging means and operates said linkage to move said controlling means to thereby interrupt the movement of said article engaging means.

23. In an apparatus for handling and transferring hot glass articles such as face plates from a pick up station to a plurality of delivering stations, the combination comprising article engaging means, means for guiding said article engaging means from a pick up station to each of a plurality of delivery stations, means for actuating said article engaging means to cause said article engaging means to engage an article at said pick up station, means for actuating said article engaging means to cause said means to invert said article, means for moving said article engaging means to each of said delivery stations, means for controlling said moving means, means responsive to the arrival of said article engaging means at a station for de-activating said controlling means and article engaging means to release an article held thereby, and means responsive to the presence of said article engaging means and an article at said pick up station for energizing said controlling means.

24. The combination set forth in claim 20 including programming means for cyclically moving said cam means at each said delivery station and thereby bringing said cam means cyclically into and out of the path of said article engaging means so that said article engaging means is moved in a cycle to the various delivery stations.

25. The combination set forth in claim 22 including programming means for cyclically moving said cam means at said delivery station and thereby bringing said cam means cyclically into and out of the path of said article engaging means so that said article engaging means are moved in a cycle to the various delivery stations.

References Cited by the Examiner

UNITED STATES PATENTS

| | | | |
|---|---|---|---|
| 1,858,642 | 5/1932 | Ross | 214—147 |
| 2,836,313 | 5/1958 | Yeo et al. | 214—1 |
| 2,988,237 | 6/1961 | Devol | 214—11 |

MARVIN A. CHAMPION, *Primary Examiner.*